United States Patent [19]
Shiraishi et al.

[11] 3,877,912
[45] Apr. 15, 1975

[54] METHOD OF PRODUCING AN OPTICAL TRANSMISSION LINE

[75] Inventors: Satoshi Shiraishi; Kunio Fujiwara; Shiro Kurosaki, all of Osaka, Japan

[73] Assignee: Sumitomo Electric Industries, Ltd., Osaka, Japan

[22] Filed: Oct. 9, 1973

[21] Appl. No.: 404,567

[52] U.S. Cl. .............................. 65/3; 65/4; 65/13; 65/DIG. 7
[51] Int. Cl. ............................................. C03b 5/26
[58] Field of Search ............ 65/3, 4, 13, 18, DIG. 7

[56] References Cited
UNITED STATES PATENTS
2,980,957  4/1961  Hicks .................................. 65/13 X
3,679,384  7/1972  Colson et al. .................. 65/DIG. 7 X
3,737,293  6/1973  Maurer ............................. 65/13 X
3,753,672  8/1973  Curtiss ......................... 65/DIG. 7 X Primary Examiner—Robert L. Lindsay, Jr.
Attorney, Agent, or Firm—Sughrue, Rothwell, Mion, Zinn & Macpeak

[57] ABSTRACT

Method of producing an optical transmission line is provided which comprises forming, on the inside wall of a highly transparent cylindrical medium, a highly transparent deposition layer having a refractive index higher than that of said cylindrical medium to form a double-layered cylinder; coaxially inserting into said cylinders, a highly transparent round rod medium having the same refractive index as that of said cylindrical medium; then melting them under heating and drawing so as to reduce the diameters thereof thereby forming a fiber comprising a double-layered cylindrical medium and round rod medium integrated coaxially without clearance between them.

16 Claims, 12 Drawing Figures

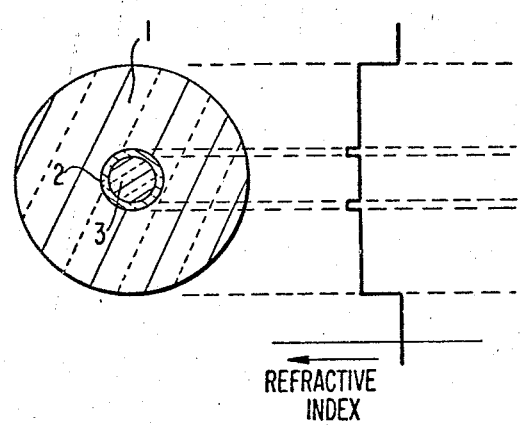
FIG. 1
FIG. 3
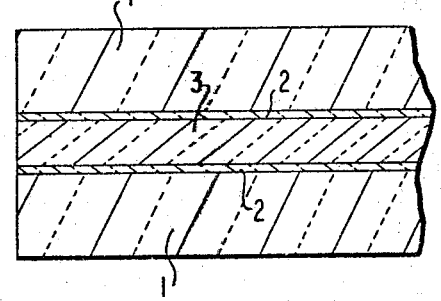
FIG. 2
REFRACTIVE INDEX
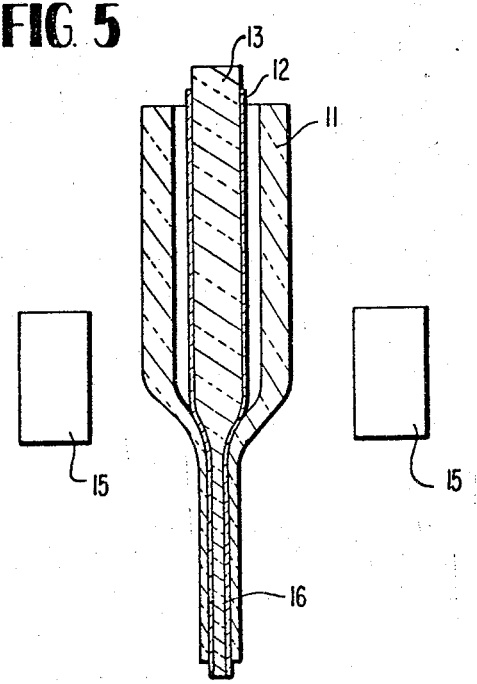
FIG. 5
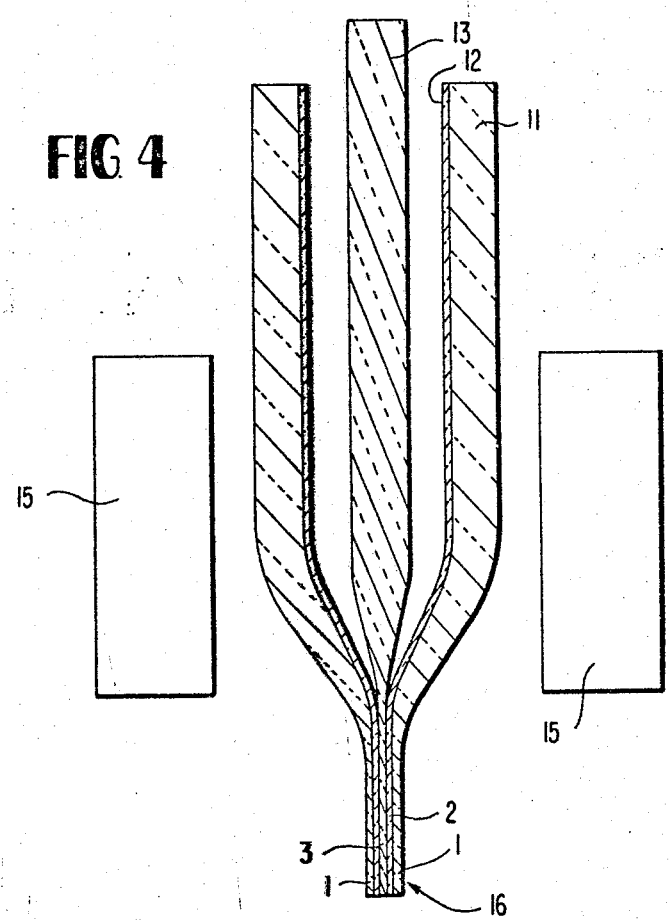
FIG. 4

REFRACTIVE INDEX

METHOD OF PRODUCING AN OPTICAL TRANSMISSION LINE

BACKGROUND OF THE INVENTION

This invention relates to a method of producing an effective optical transmission line used in the optical communication system. The optical transmission line produced by the method according to this invention comprises a triple-layered construction formed by surrounding a core body of highly pure fused silica, etc. having extremely low optical transmission loss with a thin cylindrical layer of the same material having a refractive index higher than that of said core material by several % and, further, coaxially providing thereon a cladding layer of the same material as that of the core.

The optical transmission lines comprising double-layered constructions of cores and cladding layers coated thereon and the processes for their production have widely been developed in the prior art, for example as disclosed in U.S. Pat. No. 3,659,915. An optical transmission line having a triple-layered construction is also disclosed, for example, in Japanese Patent Application which is filed by the assignee of the above U.S. patent and layed open as No. 31961/1973.

SUMMARY OF THE INVENTION

The object of this invention is to provide a method of producing an optical transmission line of a triple-layered construction which is less expensive and can easily be produced.

Briefly stated, the manufacturing method according to this invention comprises coaxially arranging on an inner surface of a cylindrical medium having an extremely high optical transmissivity a round rod of the same material as said cylindrical medium, forming on an inner surface of said cylindrical medium or on an outer surface of said round rod, a highly refractive thin deposition layer having a refractive index higher than that of said cylindrical medium by several %, and melting under heating said cylindrical medium and said round rod simultaneously in a heating furnace and then spinning them.

This invention also comprises a method of producing an optical transmission line comprising a very thin fiberous body of medium with optical transmission loss, that is, having a high dielectric loss tangent along the axis of said rod as shown in another embodiment thereof.

BRIEF DESCRIPTION OF THE DRAWINGS

FIG. 1 is a cross section of an optical transmission line produced by the method according to this invention;

FIG. 2 is a longitudinal section of the optical transmission line shown in FIG. 1;

FIG. 3 is a chart showing the distribution of refractive index on the cross section of the optical transmission line medium shown in FIG. 1;

FIG. 4 is a section of an optical transmission line for illustrating the producing method of the optical transmission line according to this invention;

FIG. 5 is an illustrative view for the producing method of the optical transmission line according to this invention;

DETAILED DESCRIPTION OF THE INVENTION

Figure 6:
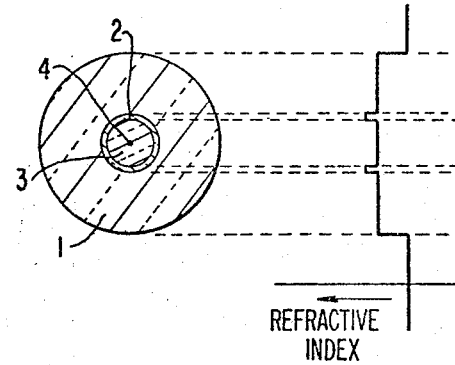
FIG. 6 is a cross section of another optical transmission line produced according to the method of this invention.

A light beam transmission method is known for the optical communication, in which a fiberous line comprising transparent material such as glass and the like is employed.

This invention relates to a fiberous line consisting of such transparent material.

An optical transmission line construction is known having cross section and longitudinal section as shown in FIG. 1 and FIG. 2 respectively. In FIGS. 1 and 2, 1 and 3 are cylindrical media transparent to light and 2 is a cylindrical medium interposed between cylinders 1 and 3, transparent to light and having a refractive index higher than that of said media 1 and 3 by several %. The refractive indices of media 1, 2 and 3 are shown in FIG. 3. The thickness of the layer 2 is a fraction of several to several tens of the transmission wavelength.

The fundamental mode in the transmission line as shown in FIGS. 1 and 2 is $HE_{11}$ mode and the modes $TE_{01}$, $HE_{21}$ . . . can successively be transmitted by increasing the transmission frequency. It has been theoretically proved that most of the optical energy is concentrated to the layer 2 in such an optical transmission line. By properly selecting the dimensions and electric property of such optical transmission line, only two modes, $HE_{11}$ and $TE_{01}$, are possible to transmit. A typical example for such transmission line includes a medium 3 of 13 $\mu$ diameter and a thin layer 2 of 0.13 $\mu$ thickness, the refractive index of media 1 and 3 being 1.50 and that of the thin layer 2 being 1.52 for the light having wavelength: $\lambda = 1\mu$. The outer diameter of the optical transmission line can optionally be determined for example from about 50 $\mu$ to about 200 $\mu$ depending on the requirement.

This invention relates to a method of producing an optical transmission line as shown in FIGS. 1 and 2. A method of producing an optical transmission line according to this invention is to be described hereinafter refering to FIG. 4, wherein reference numbers 1, 2 and 3 are employed for indicating the corresponding similar portions respectively shown in FIG. 1. In FIG. 4, 11 denotes a cylinder consisting of material such as optical glass, highly pure fused silica and the like and it is melted from its lower end and spun into a portion 1 which constitutes an optical transmission line shown in FIG. 1. 12 represents a deposition layer having a refractive index higher than that of said cylindrical medium by several % and deposited on the inner surface of said cylinder in a uniform thickness. 13 is a round rod of the same material as that of said cylinder and concentrically disposed with the cylinder, said round rod 13 being heated and melted together with the cylinder 11 from the lower ends thereof and formed as a medium 3 shown in FIG. 3. 15 shows a high temperature furnace and 16 shows a fiberous spun body respectively.

According to the method of producing an optical transmission line of this invention, the inner surface of the cylinder 11 should be finished, at first, very smoothly by way of such means as mechanical polishing, Laser finishing, sapphire polishing, fluoric acid pickling, flame smoothing and the like. Then a thin deposition layer 12 is formed on the inner surface of the cylinder 11. The material for the deposition layer 12 is the same as that of the cylindrical medium 1 with less optical transmission loss and having a refractive index higher than said cylinder by the range of 0.1–10%. Accordingly, when fused silica (refractive index 1.4584) is employed for the cylindrical medium 11, the deposition layer 12 may consisting of material having refractive index of 1.47. The material for the deposition layer may include, but not limited to, optical glass having desired refractive index, or titanium oxide, tantalum oxide, tin oxide, niobium oxide, zirconium oxide, aluminum oxide and oxides of alkaline and alkali earth metals.

The method of applying such deposition layer 12 on the inner surface of the cylinder 11 may include, without limitation, for example, radio frequency sputtering, deposition and sintering of finely divided particles formed by flame hydrolyzing, chemical vapor deposition, deposition of glass frit, vapor deposition and immersion of the inner surface of the cylinder in a fluid which will perform the ion exchange with the cylinder material 11.

As an example, a method is to be described which comprises depositing, on the inner surface of the cylinder 11, a fused silica layer containing titanium oxide by way of flame hydrolyzing. A vapor mixture of silicon tetrachloride and titanium tetrachloride in a required ratio is mixed with gaseous oxygen and passed through oxyhydrogen flame to hydrolyze the same into finely divided particles consisting of required silicon dioxide and titanium dioxide. The finely divided particles are introduced in the cylinder 11 to deposit on the inside wall thereof. The reaction temperature employed was about 1200°C. Then, by heating these cylinder 11 and deposited finely divided particles approximately to 1,600°C under oxygen atmosphere, the particles are sintered and a thin deposition layer 12 of fused silica containing titanium is thus formed on the inside wall of the cylinder 11.

The foregoing example discloses two steps in which finely divided particles consisting of a uniform mixture of silicon dioxide and titanium dioxide is deposited on the inner surface of the cylinder 11 and then sintered. Alternatively, the temperature of oxyhydrogen flame may be kept higher and glassy deposition layer consisting of a mixture of $SiO_2$ and $TiO_2$ can thus simultaneously be formed on the inner surface of the cylinder 11.

It is thus possible to form, on the inner surface of the cylinder 11, a deposition layer 12 having a refractive index higher than that of the cylinder 11 by several % according to the procedure described above. Then, a round rod 13 is inserted into the interior of the cylinders and coaxially kept there. The material for said round rod 13 is the same as that of the cylinder 11. The outer surface of the round rod is smoothly finished in the same way as described in the inner surface of said cylinder. Then, the round rod 13 and the cylinder 11 are heated by the furnace 15 therearound to such an extent as they are provided with a viscosity sufficiently low for stretching into a filamentous shape and molding, whereby materials of the cylinder 11, deposition layer 12 and the round rod 13 are softened to melt and flow downward through the furnace at constant speeds respectively. The cross section at the lower ends of the cylinder 11, deposition layer 12, and the round rod 13 are gradually decreased and they are spun till the deposition layer 12 comes to contact the outside wall of the round rod 13 and then further reduced with the diameter thereof into a fiber having a cross section as shown in FIG. 1. The procedure for drawing under heating is desired to perform in oxygen atmosphere. The molded products may be heated again and reduced with the drawn diameter thereof to desired dimension, if necessary. The products thus obtained may be subjected to further heat treatment, as required, for example, for improving the optical transmissivity of the deposition layer 12. For the deposition layer 12 the material of which is fused silica containing said titanium oxide, for example, it is desired to apply heat treatment at the temperature of 500°–1000°C more than 30 min..

Now, another embodiment of this invention is to be described. In FIG. 5, the identical reference numbers are used to denote the same portions with corresponding numbers in FIG. 4, providing that reference number 12 represents a deposition layer formed on the outside wall of the round rod 13 and the method of forming the deposition layer 12 is just the same as in FIG. 4. In the process shown in FIG. 5, a round rod 13 comprising a deposition layer 12 having a refractive index higher than that of said round rod 13 by several % on the outside wall thereof is disposed coaxially with the cylinder 11 having the same material as that of the round rod 13, and the lower ends of the round rod and cylinder are heated at a high temperature through the furnace 15 and softened to melt and then spun to a desired diameter.

Figures 7, 8:
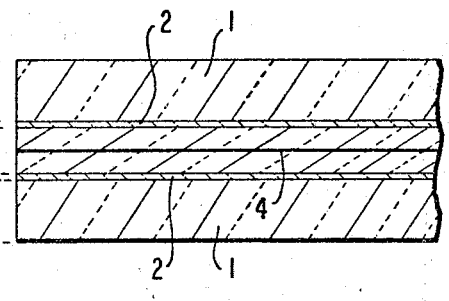
FIG. 7 is a chart showing the distribution of the refractive index on the cross section of the optical transmission line medium shown in FIG. 6.
FIG. 8 is a longitudinal section of the optical transmission line shown in FIG. 6.

The embodiment shown in FIGS. 6, 7 and 8 represents a still another type of optical transmission lines developed by the inventor of this application, wherein FIG. 6 is a cross section of another type of optical transmission line obtained by the producing method according to this invention. FIG. 8 is a longitudinal section of the transmission line shown in FIG. 6 and FIG. 7 shows a distribution of the refractive index on the cross section of the material for the optical transmission line. The reference numbers in FIGS. 6 and 8 which are identical to those in FIG. 1 are employed to indicate the same portions corresponding to those in FIG. 1, providing that the number 4 represents a very thin material provided at the center of the medium 3 and having optical transmission loss.

The optical transmission line shown in FIGS. 6 and 8 comprises optically transparent media 1 and 3, a thin layer 2 of optically transparent cylindrical medium inserted therebetween, and core medium 4 having a high optical transmission loss, provided at the center of said medium 3 and having extremely small diameter as compared with that of the thin layer 2. The thin layer 2 has a refractive index higher than that of media 1 and 3 by several % and a thickness of a fraction of several tens of the transmitted wavelength. The refractive index of the medium 4 with optical transmission loss is substantially the same as that of the media 1 and 3. In such type of a transmission line, uni-mode transmission, only for mode $TE_{01}$, is possible by properly selecting dimensions and electric properties of the line.

One example of such optical transmission lines comprises medium 1, 3 and 4 having refractive index of 1.50, thin layer 2 having refractive index of 1.52, thickness of 0.15 $\mu$ and diameter of 13 $\mu$ and a core medium with optical transmission loss having diameter of 0.2 $\mu$.

Figure 10:
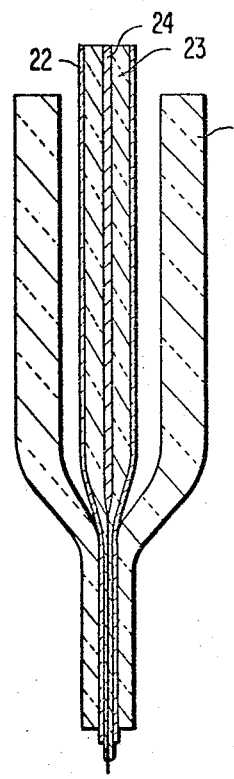
FIGS. 9 and 10 are the views for illustrating the method of producing the optical transmission line according to this invention.
Figure 9:
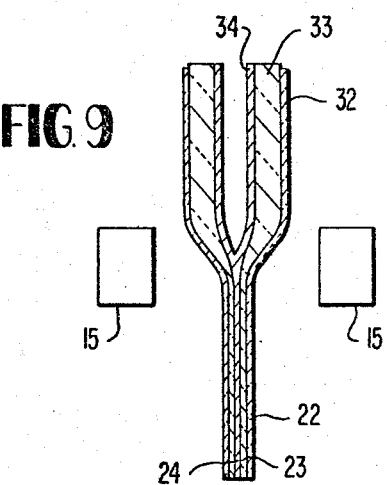

FIG. 9 and 10 illustrate the method for producing an optical transmission line as shown in FIG. 6. In FIG. 9, first cylinder 33 of transparent medium is shown which is made of material with extremely low optical transmission loss, such as optical glass, highly pure fused silica, etc. The inner and the outer surface of the cylinder 33 should be smoothed by such means as similar to those described with respect to FIG. 4, that is, mechanical polishing, Laser finishing, sapphire polishing, fluoric acid pickling, flame cleaning and the like. A deposition layer 34 with optical transmission loss for the medium 4 with optical transmission loss is formed on the inner surface of the cylinder 33 and a thin deposition layer 32 having a high refractive index greater than that of the cylinder 33 by several % is formed on the outer surface of the cylinder 33. The material for the medium 34 with optical transmission loss is selected from those having the refractive indices substantially the same as that of the medium 33 and relatively high optical absorption. Further, the physical properties of them are desired to be similar to those of the medium 33. The material include, without limination, usual glass material with relatively high optical absorption for the transmission wavelength, fused silica containing trace amount of transition element metal, and the like. Method of forming the deposition layer 34 of this medium with optical transmission loss include, without limitation, radio frequency sputtering, deposition and sintering of the finely divided particles formed by flame hydrolyzing, chemical vapor deposition, deposition of glass frit layer, vacuum deposition and immersion of the inner surface of the tube in fluid which will perform ion exchange with the medium 33.

The method for forming the deposition layer 34 having optical transmission loss on the inner surface of the cylinder 33 shown in FIG. 9 is just the same as that for forming the deposition layer 12 on the inner surface of the cylinder 11 shown in FIG. 4 and the method for forming the highly refractive deposition layer 32 on the outer surface of the cylinder 33 is just the same as that for forming the deposition layer 12 on the outer surface of the round rod 13 shown in FIG. 5.

As shown in FIG. 9, the cylindrical materials 34, 33 and 32 thus formed are vertically arranged in the furnace 15 and heated till the lower ends thereof are softened and flow downward. The lower ends of said cylindrical materials 34, 33 and 32 flow downward at a constant velocity with the diameters thereof gradually decreasing, the central clearance of the deposition layer 34 with optical transmission loss is closed and they are reduced to a desired diameters and, thereafter, cooled to solidify.

In this way, a rod is formed having a triple-layered rod body which comprises a core 24 with optical transmission loss integrated with a deposition layer with optical transmission loss, a cylinder 23 surrounding the outer periphery of said core, and a highly refractive deposition layer 22 further surrounding the outer periphery of said cylinder 24.

The rod-shaped portions 24, 23 and 22 thus formed and the second cylinder 31 surrounding them are disposed coaxially and inserted into the furnace 15. Then, the lower ends of said rod-shaped portion 24, 23 and 22 and 31 are melted to flow downward, and spun into the diameters reduced to the desired extent in the same way as shown in FIG. 4.

Figure 11:
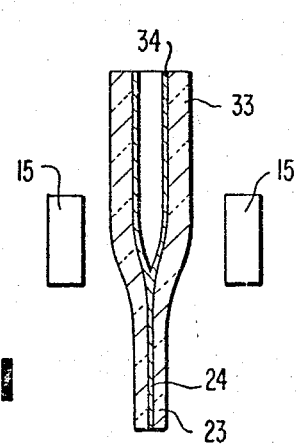
FIGS. 11 and 12 are the views for illustrating respectively another method for producing the optical transmission line shown in FIG. 6 according to this invention.
Figure 12:
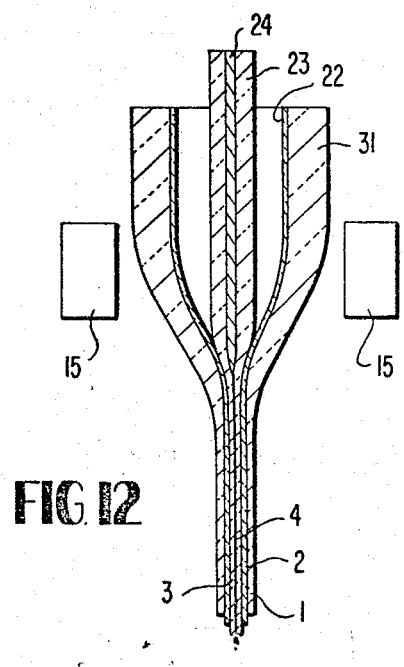

A still another embodiment of an optical transmission line according to this invention having the construction shown in FIG. 6 and 8 are to be described referring to FIGS. 11 and 12.

In FIG. 11, first cylinder 33 of transparent medium is shown which is formed by material with extremely low optical transmission loss, for example, optical glass, highly pure fused silica, etc. The inner and the outer surfaces of the cylinder 33 should be finished very smoothly and they are polished in the same way as described with the cylinder 33 shown in FIG. 9. Then, on the inner surface of the cylinder 33, a thin deposition layer 34 having a refractive index higher than that of the material of the cylinder 33 by several % is formed. The method is the same as described with regard to the embodiment shown in FIG. 9.

The lower ends of the double-layered cylinders 33 and 34 thus formed are heated in the furnace 15, softened to melt, and the clearance of the deposition layer 34 with high optical transmission loss is closed and they are drawn to a diameter reduced to a desired extent and then cooled to solidify thereby forming a double-layered rod portions 24, 23. The double-layered rod portions 24, 23 thus formed and the second cylinder 31 are coaxially disposed in the furnace 15 and the lower ends of these rod portions 24 and 23 and the second cylinder 31 are melted to flow downward and then spun to a diameter reduced to a desired extent in the same way as shown in FIG. 4. The optical transmission line as shown in FIG. 6 and FIG. 8 can be thus be obtained in which the material for the second cylinder 31 is the same as that of the first cylinder 33.

Foregoings describe the method of producing the optical transmission line by way of two steps which comprises previously forming the core portion from the first cylinder and, thereafter, coaxially holding and heating the core portion and the second cylinder in the furnace as shown in FIG. 10 and FIG. 12. Alternatively, it is possible to eliminate the step for the construction of the core portion and carry out the first and the second steps simultaneously.

What is claimed is:

1. A method of producing an optical transmission line which comprises forming, on an inside wall of highly transparent cylinder medium, a highly transparent deposition layer having a refractive index higher than that of said cylinder medium thus to form a double-layered cylinder; coaxially inserting into said cylinders, a highly transparent round rod medium having the same refractive index as that of the said cylindrical media; then heating them to melt and draw so as to reduce the diameter thereby forming a fiber comprising a double-layered cylindrical medium and a round rod medium integrated coaxially without clearance between them.

2. A method of producing an optical transmission line which comprises forming a double-layered round rod by providing, on the outer surface of a highly transparent round rod medium, a deposition layer of highly transparent medium having refractive index higher than that of said round rod medium; coaxially inserting said double-layered round rod into a highly transparent cylindrical medium having a refractive index equal to that of the inner rod portions; then, heating to melt the lower portions of them and drawing so as to decrease the cross section thereof thereby forming a coaxially integrated fiber without clearance between them.

3. A method of producing an optical transmission line which comprises forming a deposition layer of optically higher dielectric loss tangent medium on the inside wall of a first cylinder of optically highly transparent medium and heating to melt said cylinder and drawing it so as to decrease the cross section thereof to form a round rod having close structure through the cross section; forming at the same time a second double-layered construction comprising a second cylindrical portion highly transparent optically and having the same medium as that of the said first cylindrical medium and a deposition layer of highly transparent medium having a refractive index higher than that of said second cylindrical medium and formed on the inside wall of said second cylinder; inserting said round rod portion having a close cross section into said second double-layered cylinder; melting under heating and spinning the same so as to reduce the cross section thereof thereby forming a fiber without clearance comprising said round rod portion and said second cylindrical integrated together coaxially.

4. A method of producing an optical transmission line which comprises forming, on the inner and the outer surfaces of a highly transparent cylindrical medium, a thin deposition layer having a high optical dielectric loss tangent and a highly transparent deposition layer of the medium having a refractive index higher than that of said highly transparent cylindrical medium respectively; melting them under heating and drawing so as to reduce the cross section thereby forming a round rod portion being close throughout the cross section thereof; then coaxially inserting said round rod portion into a highly transparent second cylindrical medium and melting them under heating and drawing so as to decrease the cross section thereby coaxially integrating said round rod portion and said cylindrical portion to form a fiber without clearance in the cross section thereof.

5. A method of producing an optical transmission line as defined in claim 3 characterized in that a trace amount of transition elemental metal having high absorption for the used wavelength is added for forming a medium having a high dielectric loss tangent.

6. A method of producing an optical transmission line as defined in claim 1 characterized in that finely divided particles are deposited and, thereafter, sintered to effect the vitrification thereof on forming a deposition layer.

7. A method of producing an optical transmission line as defined in claim 6 characterized in that the vitrification of the finely divided particles is effected in one step on forming a deposition layer.

8. A method of producing an optical transmission line as defined in claim 3 characterized by inserting the first cylinder into the second cylinder, melting them under heating, and crushing the clearance within said first cylinder and that between said first cylinder and said second cylinder on spinning thus to form a fiber having cross section without clearance therein.

9. A method of producing an optical transmission line as defined in claim 4 characterized in that a trace amount of transition elemental metal having high absorption for the used wavelength is added for forming a medium having a high dielectric loss tangent.

10. A method of producing an optical transmission line as defined in claim 2 characterized in that finely divided particles are deposited and, thereafter, sintered to effect the vitrification thereof on forming a deposition layer.

11. A method of producing an optical transmission line as defined in claim 3 characterized in that finely divided particles are deposited and, thereafter, sintered to effect the vitrification thereof on forming a deposition layer.

12. A method of producing an optical transmission line as defined in claim 4 characterized in that finely divided particles are deposited and, thereafter, sintered to effect the vitrification thereof on forming a deposition layer.

13. A method of producing an optical transmission line as defined in claim 10 characterized in that the vitrification of the finely divided particles is effected in one step on forming a deposition layer.

14. A method of producing an optical transmission line as defined in claim 11 characterized in that the vitrification of the finely divided particles is effected in one step on forming a deposition layer.

15. A method of producing an optical transmission line as defined in claim 12 characterized in that the vitrification of the finely divided particles is effected in one step on forming a deposition layer.

16. A method of producing an optical transmission line as defined in claim 4 characterized by inserting the first cylinder into the second cylinder, melting them under heating, and crushing the clearance within said first cylinder and that between said first cylinder and said second cylinder on spinning thus to form a fiber having cross section without clearance therein.

* * * * *